US012762978B2

(12) United States Patent
Guo et al.

(10) Patent No.: US 12,762,978 B2
(45) Date of Patent: Oct. 13, 2026

(54) BRACKET STRUCTURE, SUB-DISPLAY PANEL ASSEMBLY, AND A TILED DISPLAY DEVICE

(71) Applicants: BOE MLED Technology Co., Ltd., Beijing (CN); BOE TECHNOLOGY GROUP CO., LTD., Beijing (CN)

(72) Inventors: Shaofei Guo, Beijing (CN); Shipeng Wang, Beijing (CN); Chao Tian, Beijing (CN); Dongjia Hao, Beijing (CN); Jianfeng Wang, Beijing (CN)

(73) Assignees: BOE MLED Technology Co., Ltd., Beijing (CN); Beijing BOE Technology Development Co., Ltd., Beijing (CN)

(*) Notice: Subject to any disclaimer, the term of this patent is extended or adjusted under 35 U.S.C. 154(b) by 317 days.

(21) Appl. No.: 18/291,636

(22) PCT Filed: Aug. 31, 2022

(86) PCT No.: PCT/CN2022/116273

§ 371 (c)(1),
(2) Date: Jan. 24, 2024

(87) PCT Pub. No.: WO2024/045062

PCT Pub. Date: Mar. 7, 2024

(65) Prior Publication Data

US 2025/0087120 A1 Mar. 13, 2025

(51) Int. Cl.

| | |
|---|---|
| ***G06F 1/16*** | (2006.01) |
| ***F16M 11/12*** | (2006.01) |
| ***G09F 9/302*** | (2006.01) |

(52) U.S. Cl.

CPC ......... *G09F 9/3026* (2013.01); *F16M 11/126* (2013.01)

(58) Field of Classification Search

CPC ............................ G09F 9/3026; F16M 11/126

See application file for complete search history.

(56) References Cited

U.S. PATENT DOCUMENTS

| | | | | |
|---|---|---|---|---|
| 7,607,710 | B2 * | 10/2009 | Yeo | B60R 11/0235 248/917 |
| 8,910,804 | B2 * | 12/2014 | Kim | F16M 11/10 211/87.01 |

(Continued)

FOREIGN PATENT DOCUMENTS

| | | |
|---|---|---|
| CN | 208315100 U | 1/2019 |
| CN | 214368848 U | 10/2021 |

(Continued)

*Primary Examiner* — Imani N Hayman
*Assistant Examiner* — Rashen E Morrison
(74) *Attorney, Agent, or Firm* — HOUTTEMAN LAW LLC

(57) ABSTRACT

Embodiments of the present disclosure provide a bracket structure, a sub-display panel module, and a tiled display device. The bracket structure includes a body and at least one transfer motion adjustor. The body has a support surface, an assembly surface, and at least one side surface including a first side surface. The transfer motion adjustor includes: a first rotation member and a first guide member. A first hole is provided on the first side surface, so that a first external jig adjusts the first rotation member to rotate through the end of the first rotation member close to the first side surface and exposed from the first hole. A second hole is provided on the assembly surface, and the first guide member is configured to move along the second hole to adjust a protruding amount of the first guide member on the assembly surface.

19 Claims, 10 Drawing Sheets

(56) References Cited

U.S. PATENT DOCUMENTS

| | | | | |
|---|---|---|---|---|
| 9,854,701 | B2 * | 12/2017 | Choi | F16M 11/043 |
| 10,307,001 | B1 * | 6/2019 | Fitzpatrick | F16B 5/07 |
| 10,531,581 | B2 * | 1/2020 | Seo | G09F 9/3026 |
| 11,191,178 | B2 * | 11/2021 | Iacovoni | F16B 2/10 |
| 11,719,379 | B2 * | 8/2023 | Lee | G06F 3/147<br>361/807 |
| 12,048,103 | B2 * | 7/2024 | Zhang | G09F 9/3026 |
| 12,156,352 | B2 * | 11/2024 | Zhang | H05K 5/0221 |
| 12,282,354 | B2 * | 4/2025 | Hur | G06F 1/1601 |
| 2006/0164230 | A1 * | 7/2006 | DeWind | B60K 35/81<br>340/461 |
| 2008/0100548 | A1 * | 5/2008 | Choi | B60R 11/0235<br>345/87 |
| 2008/0263924 | A1 * | 10/2008 | Nearman | G09F 9/30<br>40/607.13 |
| 2009/0295174 | A1 * | 12/2009 | Corrales | E05B 81/14<br>292/201 |
| 2016/0231976 | A1 * | 8/2016 | Ryu | G06F 3/1446 |
| 2018/0124932 | A1 * | 5/2018 | Seo | G09F 9/3026 |
| 2019/0277377 | A1 * | 9/2019 | Heo | G09F 9/3026 |
| 2019/0307267 | A1 * | 10/2019 | Fitzpatrick | A47G 1/166 |
| 2020/0103068 | A1 * | 4/2020 | Ahn | F16M 11/043 |
| 2020/0205305 | A1 * | 6/2020 | Kim | F16M 11/24 |
| 2021/0178981 | A1 * | 6/2021 | Kim | B60K 35/22 |
| 2022/0022330 | A1 * | 1/2022 | Dewaele | H05K 5/0217 |
| 2022/0198969 | A1 * | 6/2022 | Wang | G09F 9/3026 |
| 2023/0136816 | A1 * | 5/2023 | Wu | G02F 1/13336<br>361/679.01 |
| 2024/0042945 | A1 * | 2/2024 | Jang | B60K 35/81 |
| 2024/0042946 | A1 * | 2/2024 | Jang | B60K 35/00 |
| 2024/0251512 | A1 * | 7/2024 | Guo | H05K 5/0217 |
| 2024/0346960 | A1 * | 10/2024 | Hochman | H05K 1/181 |
| 2025/0078691 | A1 * | 3/2025 | Tan | G09F 9/302 |
| 2025/0084953 | A1 * | 3/2025 | Guo | G09F 9/3026 |
| 2025/0089194 | A1 * | 3/2025 | Yuan | G09F 9/3026 |
| 2025/0192114 | A1 * | 6/2025 | Guo | H10W 90/00 |

FOREIGN PATENT DOCUMENTS

| | | | |
|---|---|---|---|
| CN | 215298717 | U | 12/2021 |
| CN | 215730623 | U | 2/2022 |
| JP | 2016142861 | A | 8/2016 |
| KR | 20200144709 | A | 12/2020 |

* cited by examiner

BRACKET STRUCTURE, SUB-DISPLAY PANEL ASSEMBLY, AND A TILED DISPLAY DEVICE

CROSS-REFERENCE TO RELATED APPLICATION

This application is a National Phase Application filed under 35 U.S.C. 371 as a national stage of PCT/CN2022/116273, filed on Aug. 31, 2022, the contents of which are incorporated herein by reference in their entirety.

TECHNICAL FIELD

The present disclosure relates to the field of display technologies, and in particular, to a bracket structure, a sub-display panel module, and a tiled display device.

BACKGROUND

With the rapid development of the display technology, the tiled display device is more and more widely applied in large-scale places such as markets, cinemas, stadiums and the like, which solves the technical problems of high cost and difficult maintenance of a single large screen, while having extremely high expandability to adapt to the displaying of various sizes of images.

The tiled display device is formed by tiled a plurality of sub-display panel modules, where display substrates in the sub-display panel modules are supported by brackets.

SUMMARY

Embodiments of the present disclosure provide a bracket structure, a sub-display panel module, and a tiled display device.

In a first aspect, an embodiment of the present disclosure provides a bracket structure, including: a body and at least one transfer motion adjustor, wherein the body has a support surface, an assembly surface, and at least one side surface, the support surface is disposed opposite to the assembly surface, the side surface is disposed between the support surface and the assembly surface, the at least one side surface includes a first side surface, and the transfer motion adjustor is located inside the body;

- the transfer motion adjustor includes: a first rotation member and a first guide member connected to the first rotation member, wherein the first rotation member is close to the first side surface, and a first hole is provided on the first side surface at a position corresponding to the first rotation member, to expose an end of the first rotation member close to the first side surface, so that a first external jig adjusts the first rotation member to rotate through the end of the first rotation member close to the first side surface and exposed from the first hole; and
- a second hole is provided on the assembly surface at a position corresponding to the first guide member, and the first guide member is configured to move along the second hole in response to the rotational control of the first rotation member to adjust a protruding amount of the first guide member on the assembly surface.

In some embodiments, the first rotation member includes: a first adjusting element and a first connecting element connected to the first adjusting element, the first connecting element is located on a side of the first adjusting element away from the first side surface, and the first hole exposes the first adjusting element.

In some embodiments, the first guide member includes a first worm and a first worm wheel nested on the first worm;

- the first connecting element is provided with first threads, the first worm wheel is provided with engaging inspections matched with the first threads, the first worm wheel is configured to rotate in response to rotation of the first connecting element, and a rotation axis of the first worm wheel is perpendicular to a rotation axis of the first connecting element; and
- the first worm is provided with second threads, the second hole is provided with internal threads matched with the second threads, and the first worm is configured to rotate coaxially with the first worm wheel to move along the second hole.

In some embodiments, a first assembly space is formed inside the body at a position close to the second hole and in communication with the second hole, and the first worm and the first worm wheel are both located in the first assembly space; and

- the first guide member further includes: a first elastic component in the first assembly space, the first elastic component having one end connected to the first worm wheel and the other end connected to a bottom wall of the first assembly space close to the second hole.

In some embodiments, the first elastic component includes a first spring nested outside the first worm.

In some embodiments, the support surface is provided with a first assembly hole in communication with the first assembly space.

In some embodiments, the first rotation member extends in a first direction parallel to a plane where the assembly surface is located and intersected with the first side surface, and the first rotation member has a first hollow channel running through the first rotation member in the first direction;

- the transfer motion adjustor further includes a second rotation member and a second guide member connected to the second rotation member, wherein a portion of the second rotation member close to the first side surface is located in the first hollow channel, and an end of the first hollow channel close to the first side surface exposes an end of the second rotation member close to the first side surface, so that a second external jig adjusts the second rotation member to rotate through the end of the second rotation member close to the first side surface and exposed from the first hollow channel; and
- a fourth hole is provided on the assembly surface at a position corresponding to the second guide member, and the second guide member is configured to move along the fourth hole in response to the rotational control of the second rotation member to adjust a protruding amount of the second guide member on the assembly surface.

In some embodiments, the second rotation member includes: a second adjusting element and a second connecting element connected to the second adjusting element, the second connecting element is located on a side of the second adjusting element away from the first side surface, the second adjusting element is located in the first hollow channel, the second connecting element extends beyond the first hollow channel, and an end of the first hollow channel close to the first side surface exposes the second adjusting element.

In some embodiments, the second guide member includes a second worm and a second worm wheel nested on the second worm;

the second connecting element is provided with third threads, the second worm wheel is provided with engaging insections matched with the third threads, the second worm wheel is configured to rotate in response to rotation of the second connecting element, and a rotation axis of the second worm wheel is perpendicular to a rotation axis of the second connecting element; and the second worm is provided with fourth threads, the fourth hole is provided with internal threads matched with the fourth threads, and the second worm is configured to rotate coaxially with the second worm wheel to move along the fourth hole.

In some embodiments, a second assembly space is formed inside the body at a position close to the fourth hole and in communication with the fourth hole, and the second worm and the second worm wheel are both located in the second assembly space; and the second guide member further includes: a second elastic component in the second assembly space, the second elastic component having one end connected to the second worm wheel and the other end connected to a bottom wall of the second assembly space close to the fourth hole.

In some embodiments, the second elastic component includes a second spring nested outside the second worm.

In some embodiments, the support surface is provided with a second assembly hole in communication with the second assembly space.

In some embodiments, the end of the second rotation member close to the first side surface has a cross-section parallel to the first side surface in a second ring shape with a hexagonal inner contour.

In some embodiments, the second rotation member extends in the first direction and has a second hollow channel running through the second rotation member in the first direction;

the transfer motion adjustor further includes a third rotation member, and the at least one side surface further includes: a third side surface opposite to the first side surface in the first direction, wherein a third hole is provided on the third side surface at a position corresponding to the third rotation member to expose an end of the third rotation member close to the third side surface, and configured to allow an end of the third rotation member away from the first side surface to extend out of the third hole;

a portion of the third rotation member close to the first side surface is located in the second hollow channel, and an end of the second hollow channel close to the first side surface exposes an end of the third rotation member close to the first side surface, so that a third external jig pushes the third rotation member to extend out of the third hole and adjusts the third rotation member to rotate through the end of the third rotation member close to the first side surface and exposed from the second hollow channel; and the end of the third rotation member away from the first side surface is configured to be extendable into the first hole of a further bracket structure, and engaged with the end of the first rotation member close to the first side surface and exposed from the first hole in the further bracket structure in a direction parallel to the first side surface.

In some embodiments, the third rotation member includes: a third adjusting element and a third connecting element connected to the third adjusting element, the third connecting element is located on a side of the third adjusting element away from the first side surface, the third connecting element is located in the second hollow channel, the third adjusting element extends beyond the second hollow channel, an end of the second hollow channel close to the first side surface exposes the third adjusting element, and an end of the third connecting element away from the first side surface is extendable from the third hole.

In some embodiments, the third rotation member further includes: a location-limited element and a third elastic component, a third assembly space is formed inside the body at a position close to the third hole and in communication with the third hole;

the location-limited element is located in the third assembly space, and fixed to a portion of the third connecting element outside the second hollow channel; and the third elastic component is located in the third assembly space, having one end connected to the location-limited element and the other end connected to a side wall of the third assembly space close to the third hole.

In some embodiments, a first clamping element is provided on the location-limited element, a second clamping element is provided on the portion of the third connecting element outside the second hollow channel, and the first clamping element is engaged and fixed with the second clamping element.

In some embodiments, the elastic component includes a third spring nested on an exterior of a portion of the third connecting element in the third assembly space.

In some embodiments, the support surface is provided with a third assembly hole in communication with the third assembly space.

In some embodiments, the end of the third rotation member close to the first side surface has a cross-section parallel to the first side surface in a third ring shape with a hexagonal inner contour.

In some embodiments, the end of the first rotation member close to the first side surface has a cross-section parallel to the first side surface in a first ring shape with a hexagonal inner contour; and the end of the third rotation member away from the first side surface has a cross-section parallel to the first side surface in a hexagonal shape.

In some embodiments, a fixing component is provided on the body on a side of the assembly surface, and configured to be fixed to a case.

In some embodiments, the fixing component is connected to the assembly surface;

and/or the fixing component is connected to the first guide member;

and/or when the bracket structure includes a second guide member, the fixing component is connected to the second guide member.

In some embodiments, the fixing component includes: a magnetic member or a suction disc.

In some embodiments, two transfer motion adjustors are provided inside the body, and the two transfer motion adjustors are arranged in a direction intersected with an extending direction of the first rotation member.

In some embodiments, when the transfer motion adjustor includes a second guide member, the first and second guide members in the two transfer motion adjustors, four guide members in total, are distributed at four corners of the bracket structure, respectively.

In a second aspect, an embodiment of the present disclosure provides a sub-display panel module, including the bracket structure according to the first aspect, and a display substrate carried on the support surface of the bracket structure.

In a third aspect, an embodiment of the present disclosure provides a tiled display device, including a plurality of sub-display panel modules and a case for assembling the sub-display panel modules, wherein at least one the sub-display panel modules is the sub-display panel module according to the second aspect.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation of the present disclosure, in which.

Figure 1:
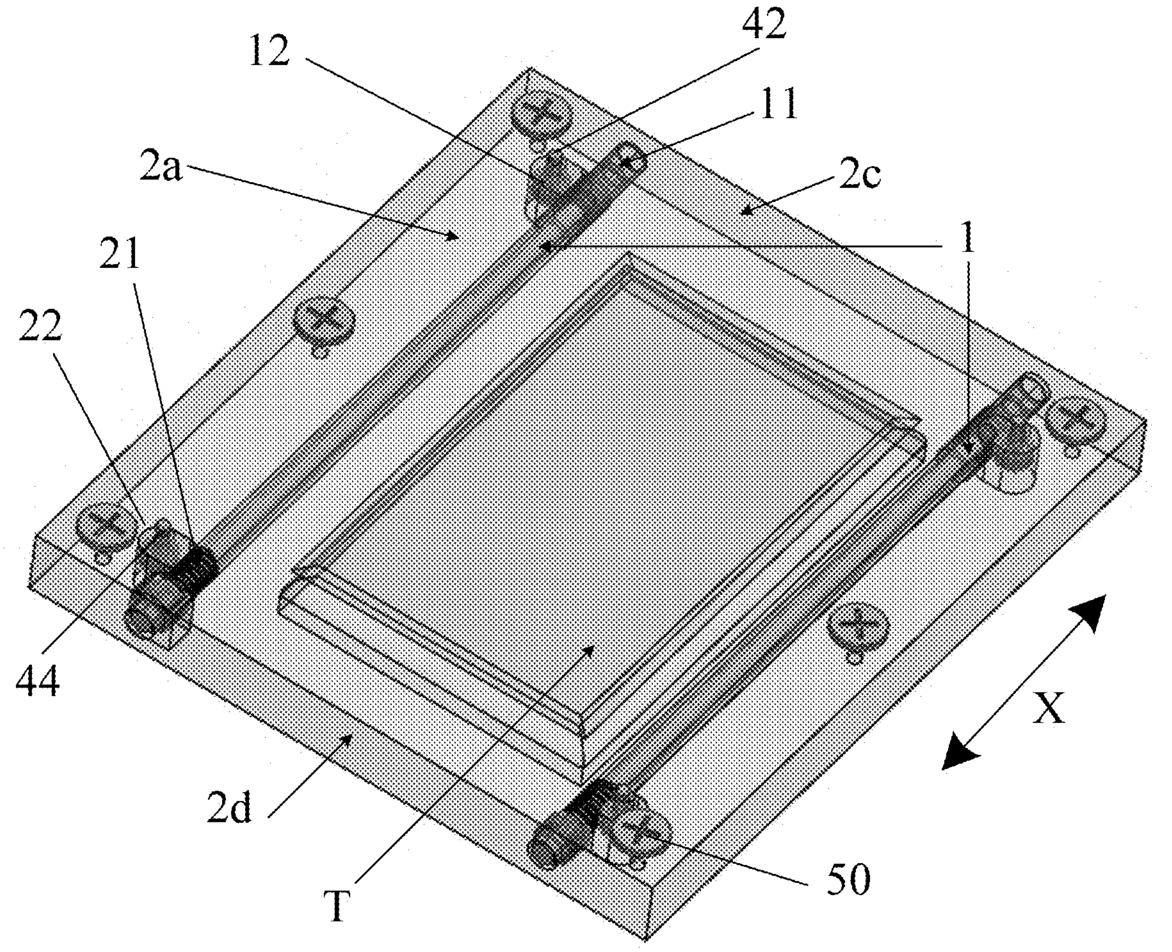
FIG. 1 is a schematic structural view of a bracket structure according to an embodiment of the present disclosure.

LIST OF REFERENCE NUMERALS bracket structure 100, case 200, display panel 300;

transfer motion adjustor 1: fourth assembly space 1A, recess T, thickness direction Z, and first direction X;

first rotation member 11, first guide member 12, first adjusting element 111, first connecting element 112, first threads 112*a*, first worm wheel 121, first worm 122, first assembly space 13, first assembly hole 130, and first hollow channel 10;

second rotation member 21, second guide member 22, second adjusting element 211, second connecting element 212, third threads 212*a*, second worm wheel 221, second worm 222, second assembly space 23, second assembly hole 230, and second hollow channel 20;

third rotation member 31, third adjusting element 311, third connecting element 312, location-limited element 313, third elastic component 314, third assembly space 32, and third assembly hole 320; first hole 41, second hole 42, third hole 43, and fourth hole 44;

body 2; assembly surface 2*a*, support surface 2*b*, first side surface 2*c*, and third side surface 2*d*; and fixing component 50.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereof.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. All other embodiments obtained by those of ordinary skill in the art based on the embodiments of the present disclosure described herein without paying any creative effort shall be included in the protection scope of the present disclosure.

Unless otherwise defined, technical or scientific terms used in the embodiments of the present disclosure are intended to have general meanings as understood by those of ordinary skill in the art. The words “first”, “second” and similar terms used in the present disclosure do not denote any order, quantity, or importance, but are used merely for distinguishing different components from each other. Likewise, the word “comprising” or “including” or the like means that the element or item preceding the word contains elements or items that appear after the word or equivalents thereof, but does not exclude other elements or items. The terms “connected” or “coupled” and the like are not restricted to physical or mechanical connections, but may include electrical connections, whether direct or indirect. The words “upper”, “lower”, “left”, “right”, or the like are merely used to indicate a relative positional relationship, and when an absolute position of the described object is changed, the relative positional relationship may be changed accordingly.

With the rapid development of display technology, the tiled display device is more and more widely applied in large-scale places such as markets, cinemas, stadiums and the like, which solves the technical problems of high cost and difficult maintenance of a single large screen, has extremely high expandability and can be suitable for displaying images with various sizes.

The tiled display device includes a plurality of sub-display panel modules and a case, where each of the sub-display panel modules includes a display substrate and a bracket for carrying the display substrate. In the assembly process, a segment difference may be formed between brackets of adjacent sub-display panel modules, and to repair the segment difference, the sub-display panel modules have to be re-installed, which may affect the assembly efficiency of the tiled display device. In addition, poor assembly of the brackets may further cause display tiled seams between adjacent display substrates, affecting flatness of the whole tiled display device and thus causing adverse effects on the display effect.

To solve at least one of the above technical problems, an embodiment of the present disclosure provides a bracket structure configured to adjust a height of a support surface of the bracket structure to adjust the flatness of a plurality of sub-display panel modules in a tiled display device, thereby improving the display effect and the yield of tiled assembly.

Figure 2:
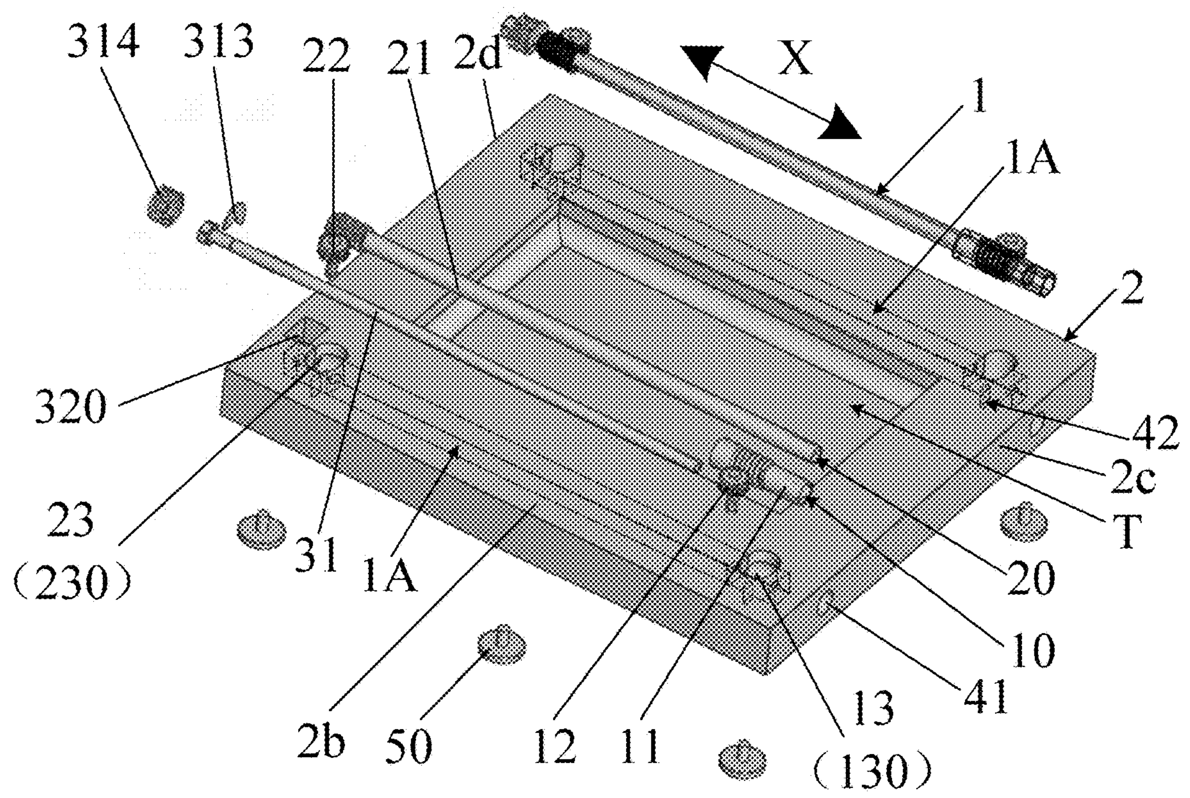
FIG. 2 is an exploded view of a bracket structure according to an embodiment of the present disclosure.

FIG. 1 is a schematic structural view of a bracket structure according to an embodiment of the present disclosure, and FIG. 2 is an exploded view of a bracket structure according to an embodiment of the present disclosure. As shown in FIGS. 1 and 2, the bracket structure includes a body 2 and at least one transfer motion adjustor 1.

The body 2 has a support surface 2*b*, an assembly surface 2*a*, and at least one side surface. The support surface 2*b* is disposed opposite to the assembly surface 2*a*, and the side surface is disposed between the support surface 2*b* and the assembly surface 2*a*. The at least one side surface includes a first side surface 2*c*, and the transfer motion adjustor 1 is located inside the body 2.

The transfer motion adjustor 1 includes: a first rotation member 11 and a first guide member 12 connected to the first rotation member 11. The first rotation member 11 is close to the first side surface 2*c*. A first hole 41 is provided on the first side surface 2*c* at a position corresponding to the first rotation member 11, to expose an end of the first rotation member 11 close to the first side surface 2*c*, so that a first external jig adjusts the first rotation member 11 to rotate through the end of the first rotation member 11 close to the first side surface 2*c* exposed from the first hole 41.

A second hole 42 is provided on the assembly surface 2*a* at a position corresponding to the first guide member 12, and the first guide member 12 is configured to move along the second hole 42 in response to the rotational control of the first rotation member 11 to adjust a protruding amount of the first guide member 12 on the assembly surface 2*a*.

In the bracket structure provided in the embodiments of the present disclosure, first, the first rotation member 11 can be directly adjusted in a rotation manner through the first hole 41 on the first side surface 2*c* of the bracket structure, so that when the transfer motion adjustor 1 is adjusted, the bracket structure on a side of the support surface 2*b* of the bracket structure will not interfere with the first hole 41, or affect operation of a first external jig through the first hole 41, thereby improving the adjusting efficiency and convenience in the assembly process; and second, rotation of the first rotation member 11 can drive the first guide member 12 to move to adjust a protruding amount of the first guide member 12 on the assembly surface 2*a*, and thus adjust a position of the transfer motion adjustor 1, and since the transfer motion adjustor 1 located inside the body 2 of the bracket structure, position adjustment of the bracket structure can be implemented to ensure that display surfaces of the plurality of display substrates in the tiled display device are located in the same plane when spliced, thereby improving the display effect.

It should be noted that, as shown in FIGS. 1 and 2, the bracket structure provided in the embodiment of the present disclosure is configured to support a display panel, and a recess T with a rectangular opening is provided in a central area of the body 2 of the bracket structure, and configured to receive a circuit board connected to the display panel and configured to provide a drive signal for the display panel. The opening shape and size of the recess T can be flexibly set according to the shape/size of the circuit board, which is not limited in the embodiments of the present disclosure.

Figure 3:
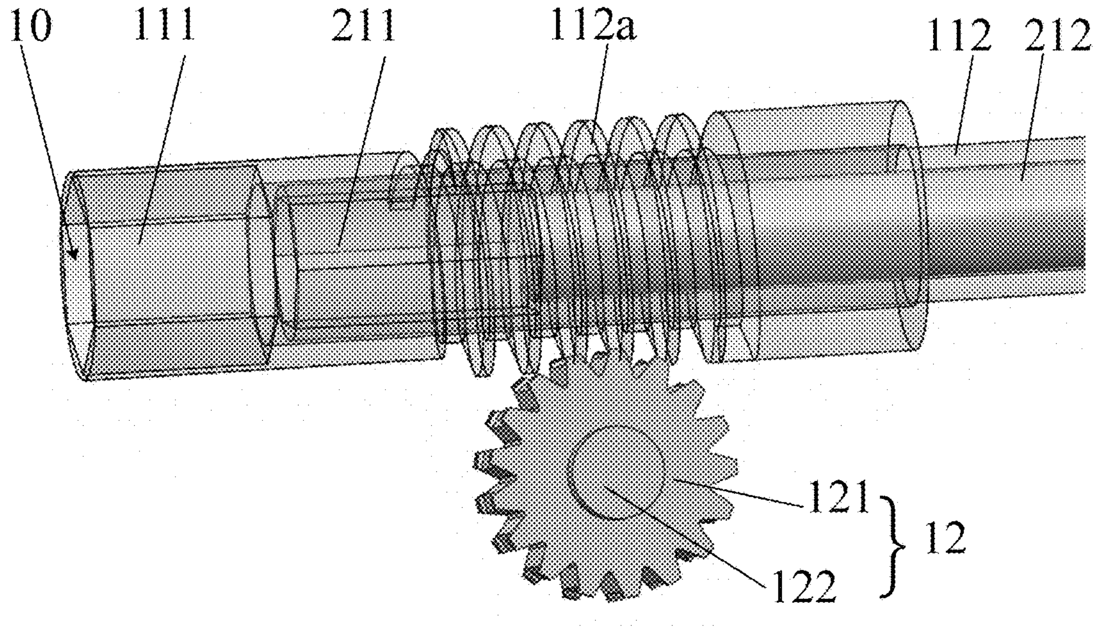
FIG. 3 is a schematic structural view of a first rotation member according to an embodiment of the present disclosure.

FIG. 3 is a schematic structural view of a first rotation member according to an embodiment of the present disclosure. In some embodiments, as shown in FIGS. 1 to 3, the first rotation member 11 includes: a first adjusting element 111 and a first connecting element 112 connected to the first adjusting element 111. The first connecting element 112 is located on a side of the first adjusting element 111 away from the first side surface 2*c*, and the first hole 41 exposes the first adjusting element 111. Optionally, the first adjusting element 111 and the first connecting element 112 are integrally formed.

In some embodiments, the end of the first rotation member 11 close to the first side surface 2*c* has a cross-section parallel to the first side surface 2*c* in a first ring shape with a hexagonal inner contour. In other words, the end of the first adjusting element 111 exposed from the first hole 41 has a hexagonal inner contour, so the first external jig used for adjustment may be a hexagonal wrench which is a general assembly tool. Therefore, the assembly and adjustment of the bracket structure are facilitated, adaptability of the bracket structure is improved, and the bracket structure can be adjusted quickly and conveniently in either indoor or outdoor environments.

Figure 4:
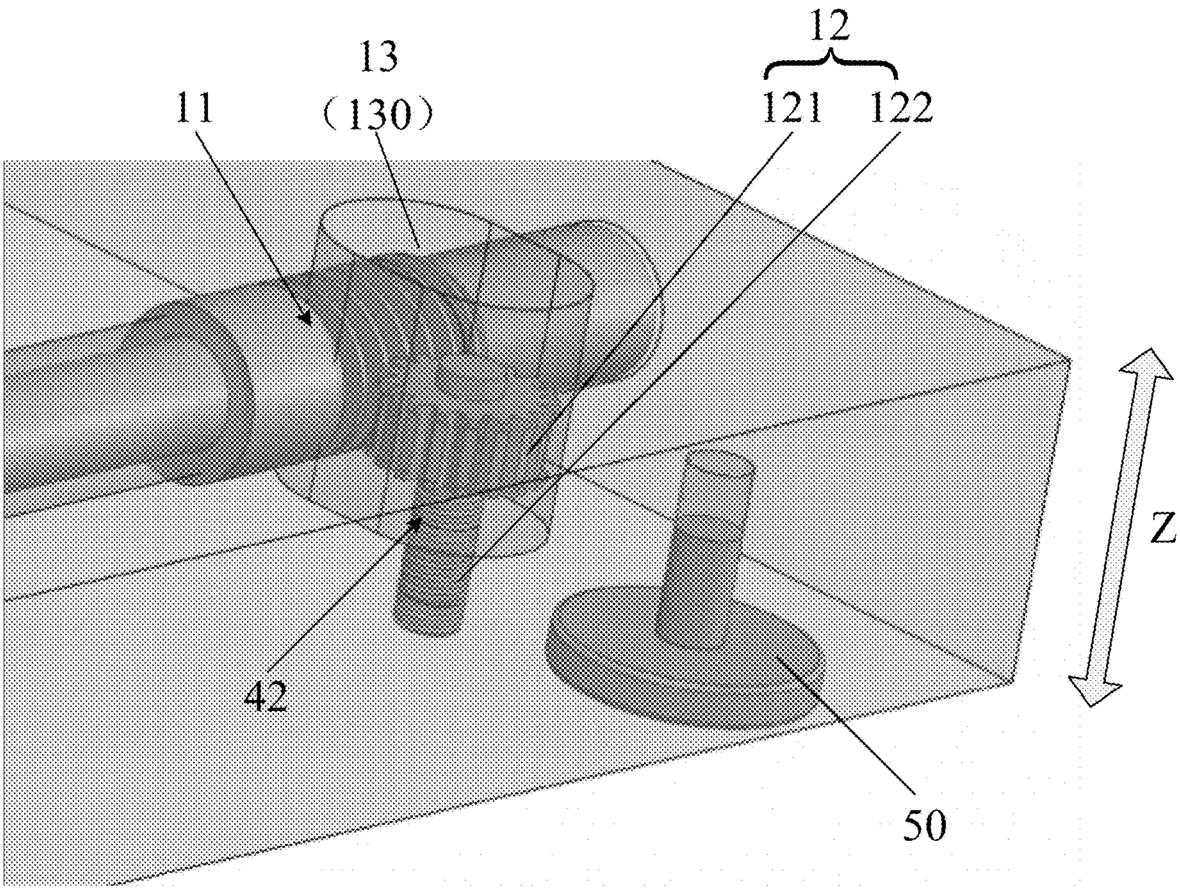
FIG. 4 is a partial schematic view of a bracket structure according to an embodiment of the present disclosure.
Figure 5:
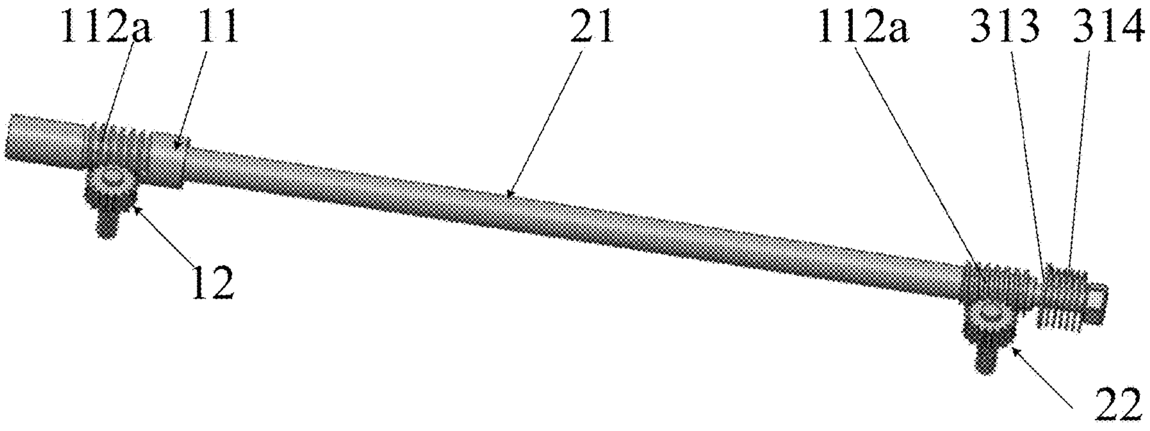
FIG. 5 is a schematic structural view of a transfer motion adjustor according to an embodiment of the present disclosure.

FIG. 4 is a partial schematic view of a bracket structure according to an embodiment of the present disclosure, and FIG. 5 is a schematic structural view of a transfer motion adjustor according to an embodiment of the present disclosure. In some embodiments, as shown in FIGS. 4 and 5, the first guide member 12 includes a first worm 122 and a first worm wheel 121 nested on the first worm 122. Optionally, the first worm wheel 121 and the first worm 122 are made of the same material.

The first connecting element 112 is provided with first threads 112*a*, the first worm wheel 121 is provided with engaging insections matched with the first threads 112*a*, the first worm wheel 121 is configured to rotate in response to rotation of the first connecting element 112, and a rotation axis of the first worm wheel 121 is perpendicular to a rotation axis of the first connecting element 112. As shown in FIG. 4, the rotation axis of the first connecting element 112 is parallel to an extending direction of the first connecting element 112, and a direction perpendicular to the rotation axis of the first connecting element 112 may be a thickness direction Z of the bracket structure. Therefore, while the first connecting element 112 is rotated, the first worm wheel 121 is rotated around the rotation axis of the first worm wheel

121, and moved linearly in the thickness direction Z of the bracket structure. The first worm 122 is provided with second threads, the second hole 42 is provided with internal threads matched with the second threads, and the first worm 122 is configured to rotate coaxially with the first worm wheel 121 to move along the second hole 42 and thus adjust an telescopic amount of the first guide member 12 on the assembly surface 2*a* of the bracket structure, thereby implementing position adjustment of the bracket structure.

In some embodiments, as shown in FIGS. 2 and 4, a first assembly space 13 is formed inside the body 2 at a position close to the second hole 42 and in communication with the second hole 42, and the first worm 122 and the first worm wheel 121 are both located in the first assembly space 13.

The first guide member 12 further includes: a first elastic component (not shown in the figure) in the first assembly space 13. The first elastic component has one end connected to the first worm wheel 121 and the other end connected to a bottom wall of the first assembly space 13 on a side close to the assembly surface 2*a*, so that the first guide member 12 is maintained in a stable state when the telescopic amount of the first guide member 12 on the assembly surface 2*a* of the bracket structure is changed.

The bottom wall of the first assembly space 13 on the side close to the assembly surface 2*a* refers to a surface of the first assembly space 13 close to the assembly surface 2*a*; and the second hole 42 communicates from the assembly surface 2*a* to the bottom wall of the first assembly space 13.

In some embodiments, the first elastic component includes a first spring nested outside the first worm 122. In one example, the first spring may be a preloaded spring, and when the telescopic amount of the first guide member 12 on the bracket structure assembly surface 2*a* is changed, the first spring provides a preloaded elastic force to ensure stability of the first guide member 12.

It should be noted that the stable state refers to a state in which the first guide member 12 can be smoothly extended or retracted under the action of the first elastic component. When the telescopic amount of the first guide member 12 on the bracket structure assembly surface 2*a* is changed, an telescopic amount of the first spring is also changed in an opposite direction to the telescopic amount of the first guide member 12, so that the first guide member 12 can be smoothly extended or retracted.

In some embodiments, as shown in FIGS. 2 and 4, the support surface 2*b* is provided with a first assembly hole 130 communicating from the support surface 2*b* to the first assembly space 13. The first assembly hole 130 is configured to place the first guide member 12 in the first assembly space 13 during assembly of the transfer motion adjustor 1, and make the first guide member 12 cooperate with the first rotation member 11 assembled to the body 2 of the bracket structure through the first hole 41 to adjust the position of the bracket structure, thereby reducing the assembly difficulty of the transfer motion adjustor and facilitating convenient use of the bracket structure.

Figure 6:
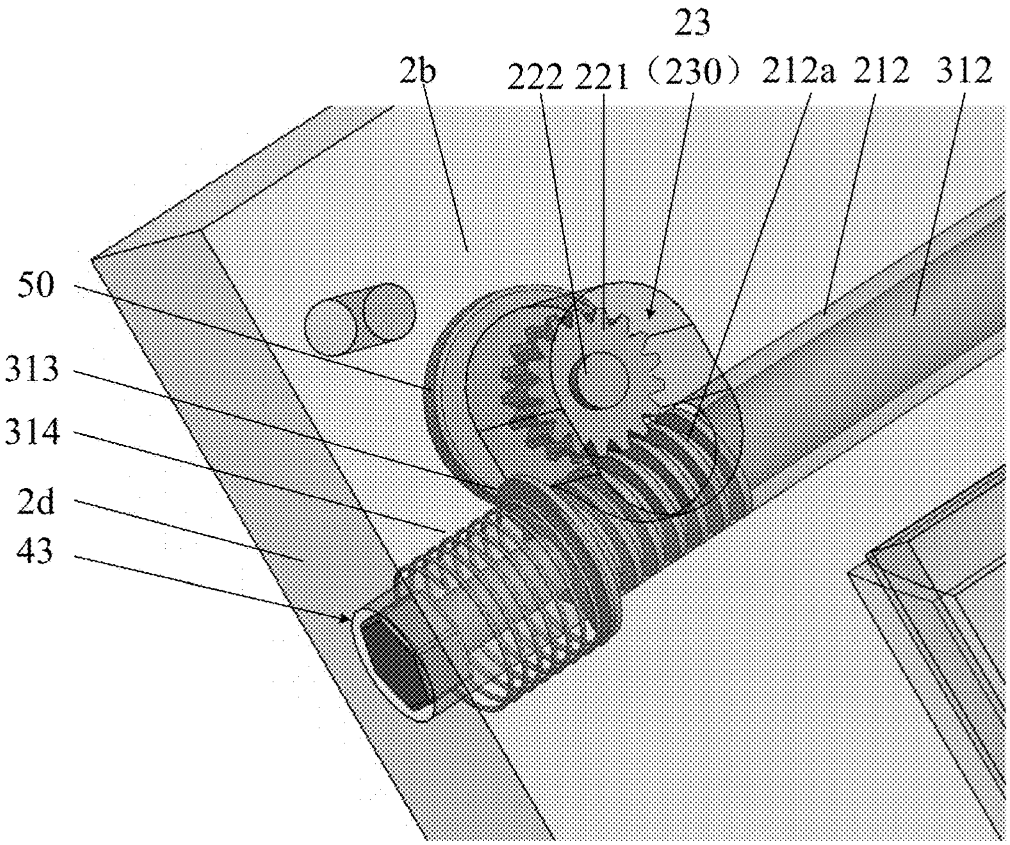
FIG. 6 is a partial schematic view of another bracket structure according to an embodiment of the present disclosure.

FIG. 6 is a partial schematic view of another bracket structure according to an embodiment of the present disclosure. In some embodiments, as shown in FIGS. 1, 2, 5 and 6, the first rotation member 11 extends in a first direction X parallel to a plane where the assembly surface 2*a* is located and intersected with the first side surface 2*c*, and the first rotation member 11 has a first hollow channel 10 running through the first rotation member 11 in the first direction.

The transfer motion adjustor 1 further includes a second rotation member 21 and a second guide member 22 connected to the second rotation axis. A portion of the second rotation member 21 close to the first side surface 2*c* is located in the first hollow channel 10, and an end of the first hollow channel 10 close to the first side surface 2*c* exposes an end of the second rotation member 21 close to the first side surface 2*c*, so that a second external jig adjusts the second rotation member 21 to rotate through the end of the second rotation member 21 close to the first side surface 2*c* exposed from the first hollow channel 10. Since the first hole 41 is provided on the first side surface 2*c* at the position corresponding to the first rotation member 11, to expose the end of the first rotation member 11 close to the first side surface 2*c*, and the portion of the second rotation member 21 close to the first side surface 2*c* is located in the first hollow channel 10 of the first rotation member 11, the end of the second rotation member 21 close to the first side surface 2*c* is also exposed from the first hole 41. In other words, both the first rotation member 11 and the second rotation member 21 can be adjusted through the first hole 41.

As shown in FIGS. 1 and 2, a fourth hole 44 is provided on the assembly surface 2*a* at a position corresponding to the second guide member 22, and the second guide member 22 is configured to move along the fourth hole 44 in response to the rotational control of the second rotation member 21 to adjust a protruding amount of the second guide member 22 on the assembly surface 2*a*, so that position adjustment of the bracket structure can be implemented to ensure that display surfaces of the plurality of display substrates in the tiled display device are located in the same plane when spliced, thereby improving the display effect.

Figure 7:
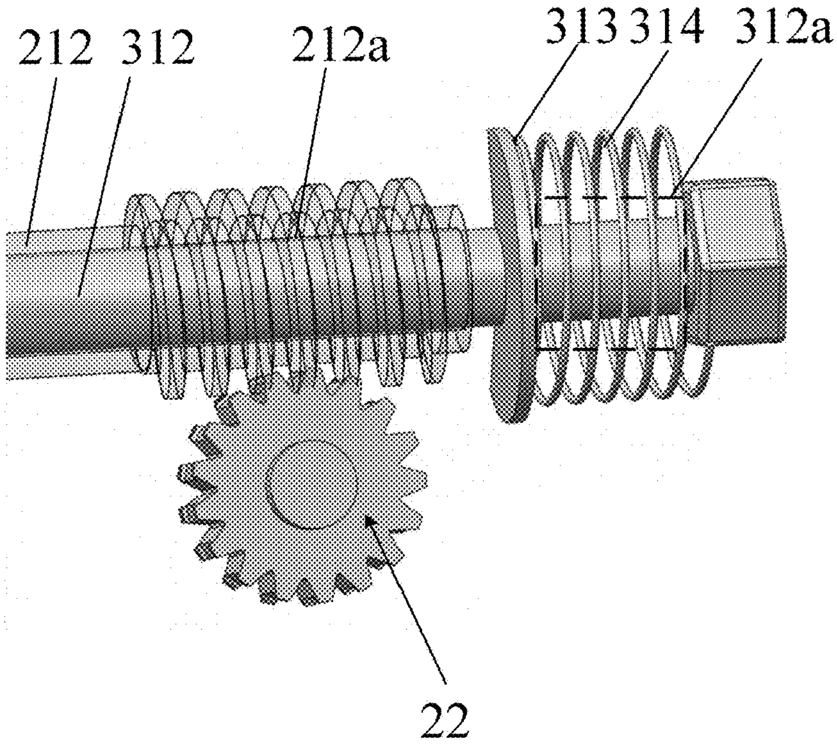
FIG. 7 is a schematic structural view of a second rotation member according to an embodiment of the present disclosure.

FIG. 7 is a schematic structural view of a second rotation member according to an embodiment of the present disclosure. In some embodiments, as shown in FIGS. 3 and 7, the second rotation member 21 includes: a second adjusting element 211 and a second connecting element 212 connected to the second adjusting element 211. The second connecting element 212 is located on a side of the second adjusting element 211 away from the first side surface 2*c*, the second adjusting element 211 is located in the first hollow channel 10, the second connecting element 212 extends beyond the first hollow channel 10, and an end of the first hollow channel 10 close to the first side surface 2*c* exposes the second adjusting element 211.

Figure 8:
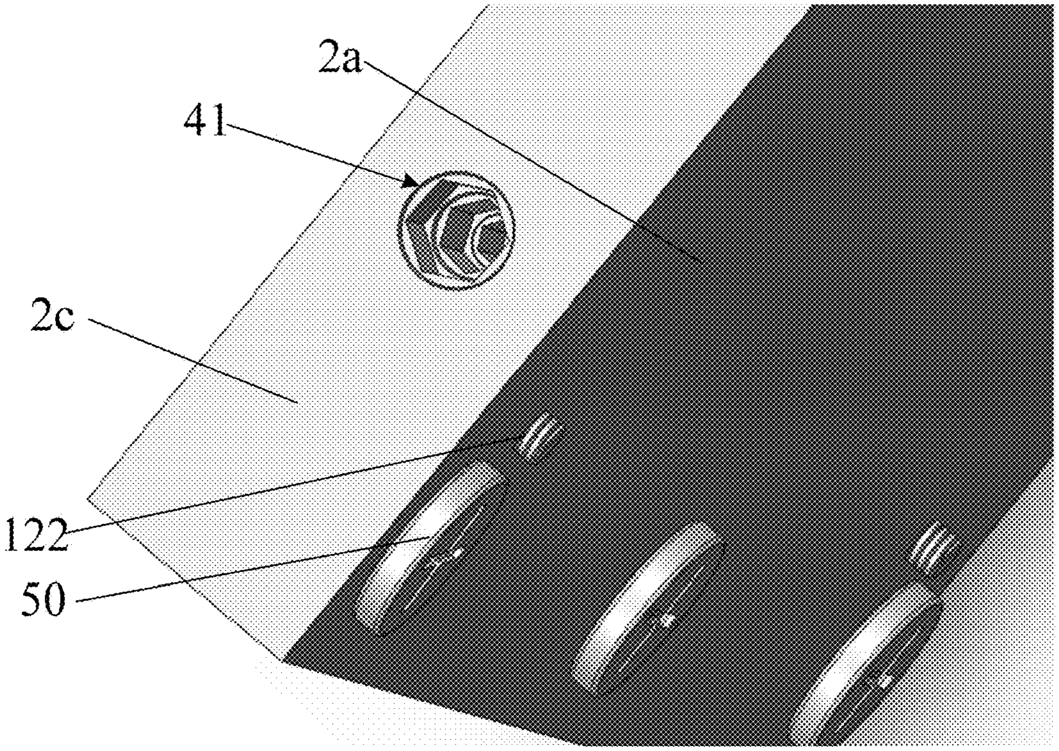
FIG. 8 is a partial schematic view of another bracket structure according to an embodiment of the present disclosure.

FIG. 8 is a partial schematic view of another bracket structure according to an embodiment of the present disclosure. In some embodiments, as shown in FIGS. 6 to 8, the end of the second rotation member 21 close to the first side surface 2*c* has a cross-section parallel to the first side surface 2*c* in a second ring shape with a hexagonal inner contour. In other words, the end of the second adjusting element 211 exposed from the first hole 41 has a hexagonal inner contour, therefore, similar to the first external jig, the second external jig used for adjusting the second adjusting element 211 may also be a hexagon wrench, which can facilitate assembly and/or adjustment the bracket structure, and improve adaptability of the bracket structure.

It should be noted that since the portion of the second rotation member 21 close to the first side surface 2*c* is located in the first hollow channel 10 of the first rotation member 11, and the end of the first hollow channel 10 close to the first side surface 2*c* exposes the second adjusting element 211, the first ring shape has a diameter larger than the second ring shape. Furthermore, the first external jig matched with the inner contour of the first ring shape has greater specifications than the second external jig matched with the inner contour of the second ring shape.

In some embodiments, as shown in FIGS. 1, 6, and 7, the second guide member 22 includes a second worm 222 and a second worm wheel 221 nested on the second worm 222. Optionally, the second worm 222 and the second worm gear 221 are made of the same material.

The second connecting element 212 is provided with third threads 212*a*, the second worm wheel 221 is provided with engaging insections matched with the third threads 212*a*, the second worm wheel 221 is configured to rotate in response to rotation of the second connecting element 212, and a rotation axis of the second worm wheel 221 is perpendicular to a rotation axis of the second connecting element 212. As shown in FIG. 6, the rotation axis of the second connecting element 212 is parallel to an extending direction of the first connecting element 112, and a direction perpendicular to the rotation axis of the second connecting element 212 can be a thickness direction of the bracket structure. Therefore, while the second connecting element 212 is rotated, the second worm wheel 221 is rotated around the rotation axis of the first worm wheel 121, and moved linearly in the thickness direction of the bracket structure. The second worm 222 is provided with fourth threads, the fourth hole 44 is provided with internal threads matched with the fourth threads, and the second worm 222 is configured to rotate coaxially with the second worm wheel 221 to move along the fourth hole 44 and thus adjust an telescopic amount of the second guide member 22 on the assembly surface 2*a* of the bracket structure, thereby implementing flatness adjustment of the support surface 2*b* of the bracket structure.

In some embodiments, as shown in FIGS. 1 and 6, a second assembly space 23 is formed inside the body 2 at a position close to the fourth hole 44 and in communication with the fourth hole 44, and the second worm 222 and the second worm wheel 221 are both located in the second assembly space 23.

The second guide member 22 further includes: a second elastic component (not shown in the figure) in the second assembly space 23. The second elastic component has one end connected to the second worm wheel 221 and the other end connected to a bottom wall of the second assembly space 23 close to the fourth hole 44, so that the second guide member 22 is maintained in a stable state when the telescopic amount of the second guide member 22 on the assembly surface 2*a* of the bracket structure is changed.

The bottom wall of the fourth hole 44 to which the second assembly space 23 is close refers to a surface in the second assembly space 23 parallel to the assembly surface 2*a* or the support surface 2*b*, in which the second hole 44 is defined.

In some embodiments, the second elastic component includes a second spring nested outside the second worm 222. In one example, the second spring may be a preloaded spring, and when the telescopic amount of the second guide member 22 on the bracket structure assembly surface 2*a* is changed, the second spring provides a preloaded elastic force to ensure stability of the second guide member 22.

In some embodiments, as shown in FIGS. 1, 2, and 6, the support surface 2*b* is provided with a second assembly hole 230 in communication with the second assembly space 23. The second assembly hole 230 is configured to place the second guide member 22 in the second assembly space 23 during assembly of the transfer motion adjustor 1, and make the second guide member 12 cooperate with the second rotation member 21 assembled to the body 2 of the bracket structure through the first hole 41 to adjust the position of the bracket structure, thereby reducing the assembly difficulty of the transfer motion adjustor and facilitating convenient use of the bracket structure.

In the transfer motion adjustor 1, the first adjusting element 111 on the first rotation member 11 and the second adjusting element 211 on the second rotation member 21 are both exposed from the first hole 41. Therefore, an external jig can be used to adjust either of the rotation members through the first hole 41 on the first side surface 2*c*. Meanwhile, the first guide member 12 and the second guide member 22 are located at two corners of the bracket structure, so that in the adjusting process, the telescopic amount of one of the guide members on the assembly surface 2*a* can be adjusted adaptively according to a state of the support surface 2*b* of the bracket structure, or the first guide member 12 and the second guide member 22 may be adjusted to have different telescopic amounts on the assembly surface 2*a* of the bracket structure. To sum up, in the bracket structure provided in the embodiments of the present disclosure, one side of the support surface 2*b* close to the first side surface 2*c* and the other side away from the first side surface 2*c* can be adjusted differently through the first hole 41 to increase the flexibility in adjustment of the bracket structure, so as to adjust the position of the bracket structure to ensure that display surfaces of the plurality of display substrates in the tiled display device are located in the same plane when spliced, thereby improving the display effect.

Figure 9:
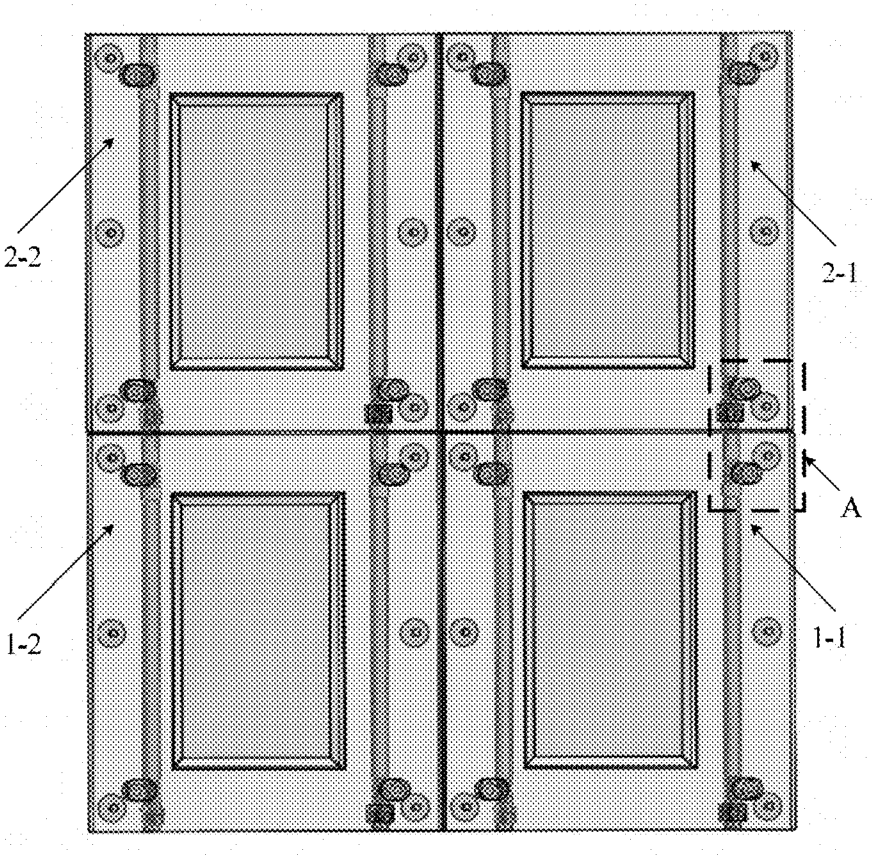
FIG. 9 is a schematic structural view of a multi-bracket structure according to an embodiment of the present disclosure.
Figure 10:
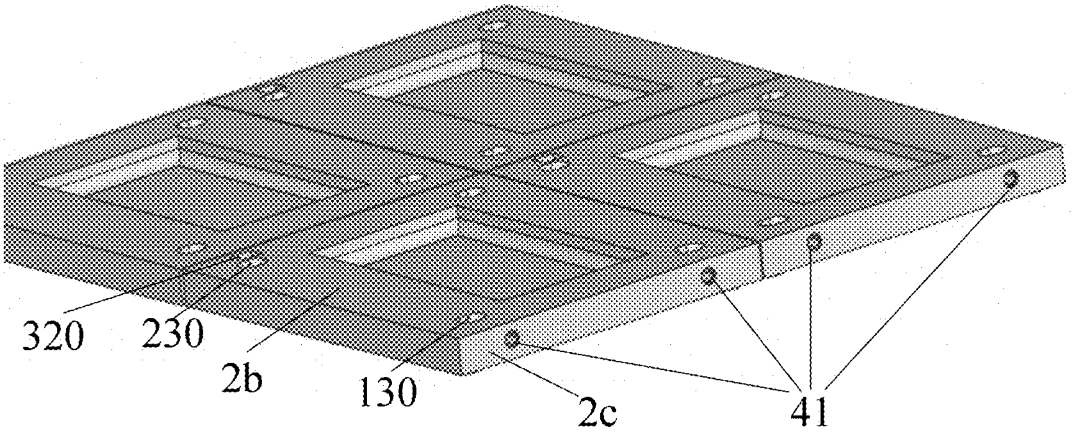
FIG. 10 is a schematic structural view of another multi-bracket structure according to an embodiment of the present disclosure.

FIG. 9 is a schematic structural view of a multi-bracket structure according to an embodiment of the present disclosure, and FIG. 10 is a schematic structural view of another multi-bracket structure according to an embodiment of the present disclosure. In some embodiments, the tiled display device includes a plurality of sub-display panel modules arranged in an array. For example, the tiled display device can include four sub-display panel modules arranged in two rows and two columns, and positions of bracket structures in the four sub-display panel modules can be as shown in FIG. 9, i.e., a bracket structure 1-1, a bracket structure 1-2, a bracket structure 2-1, and a bracket structure 2-2. In this case, the first hole 41 on the first side surface 2*c* of the bracket structure 1-1 is shielded by the bracket structure 2-1, making it impossible to adjust the exposed first adjusting element 111 and second adjusting element 211 through the first hole 41 to adjust flatness of the bracket structure 1-1.

On this basis, in the bracket structure according to the embodiments of the present disclosure, the transfer motion adjustor 1 further includes a third rotation member 31.

Figure 11:
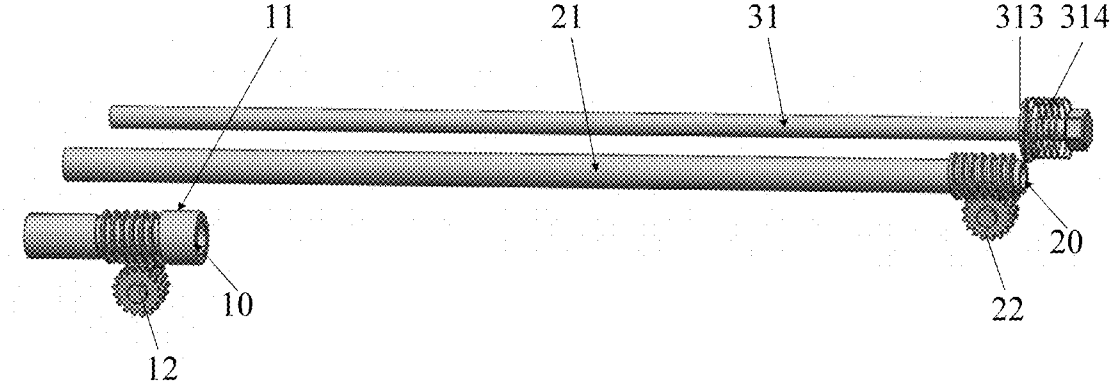
FIG. 11 is a schematic structural view of another bracket structure according to an embodiment of the present disclosure.

FIG. 11 is a schematic structural view of another bracket structure according to an embodiment of the present disclosure. In some embodiments, as shown in FIGS. 2 and 11, the second rotation member 21 extends in the first direction and has a second hollow channel 20 running through the second rotation member 21 in the first direction.

The transfer motion adjustor 1 further includes a third rotation member 31, and the at least one side surface further includes: a third side surface 2*d* opposite to the first side surface 2*c* in the first direction. A third hole 43 is provided on the third side surface 2*d* at a position corresponding to the third rotation member 31 to expose an end of the third rotation member 31 close to the third side surface 2*d*, and configured to allow an end of the third rotation member 31 away from the first side surface 2*c* to extend out of the third hole 43.

A portion of the third rotation member 31 close to the first side surface 2*c* is located in the second hollow channel 20, and an end of the second hollow channel 20 close to the first side surface 2*c* exposes an end of the third rotation member 31 close to the first side surface 2*c*, so that a third external jig pushes the third rotation member 31 to extend out of the third hole 43 and adjusts the third rotation member 31 to rotate through the end of the third rotation member 31 close to the first side surface 2_c_ exposed from the second hollow channel 20.

The end of the third rotation member 31 away from the first side surface 2_c_ is configured to be extendable into the first hole 41 of a further bracket structure, and engaged with the end of the first rotation member 11 close to the first side surface 2_c_ exposed from the first hole 41 in the further bracket structure in a direction parallel to the first side surface 2_c_.

For any one of the plurality of bracket structures, the third side surface 2_d_ is disposed opposite to the first side surface 2_c_, and since the third side surface 2_d_ is provided with the third hole 43 on the end of the third rotation member 31 close to the third side surface 2_d_, and the end of the third rotation member 31 close to the first side surface 2_c_ is exposed from the second hollow channel 20, i.e., exposed from the first hole 41, the third hole 43 in the third side surface 2_d_ and the first hole 41 in the first side surface 2_c_ are also disposed opposite to each other.

Figure 12:
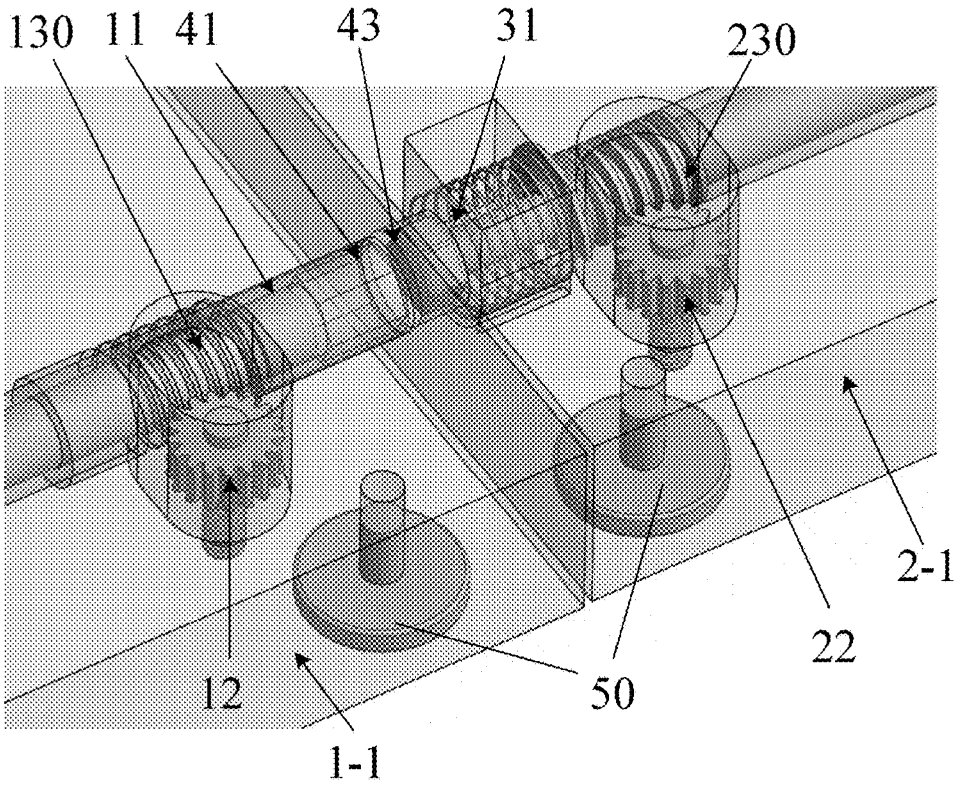
FIG. 12 is a schematic structural view of a region A in FIG. 9.
Figure 13:
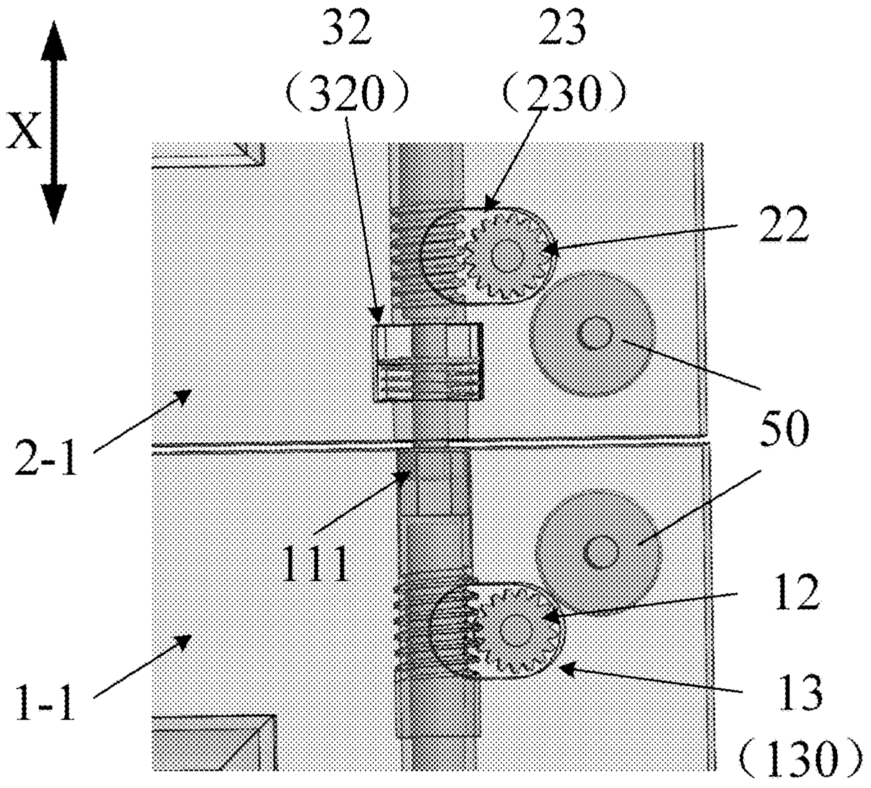
FIG. 13 is a partial schematic view of a multi-bracket structure.

FIG. 12 is a schematic structural view of a region A in FIG. 9, where the region A is a tiled region between two adjacent brackets. As shown in FIG. 12, on the premise that the first hole 41 and the third hole 43 are disposed opposite to each other on the bracket structure, the first hole 41 in the bracket structure 1-1 is shielded by the bracket structure 2-1. FIG. 13 is a partial schematic view of a multi-bracket structure. As shown in FIGS. 12 and 13, a third external jig is used to push an end of the third rotation member 31 of the bracket structure 2-1 close to the first side surface 2_c_, to drive an end of the third rotation member 31 close to the third side surface 2_d_ to extend out of the third hole 43 into the first hole 41 of the bracket structure 1-1 and engage with an end of the first rotation member 11 of the bracket structure 1-1 close to the first side surface 2_c_, i.e., the first adjusting element 111 of the bracket structure 1-1.

In the above adjustment mode, the third connecting element 312 of the bracket structure 2-1 is equivalent to be used to adjust the structural member of the bracket structure 1-1, so an outer contour of an end of the third rotation member 31 of the bracket structure 2-1, close to the third side surface 2_d_ can extend into the first hole 41 of the bracket structure 1-1 to be adapted to an inner contour of the first adjusting element 111 of the bracket structure 1-1 for control and adjustment, so that in the process of adjusting the flatness of the plurality of bracket structures, the assembled bracket structures can be adjusted without being disassembled repeatedly, thereby avoiding a segment difference between adjacent bracket structures, implementing flatness adjustment of the support surface of the bracket structure, and improving the display effect of the tiled display device.

Figure 14:
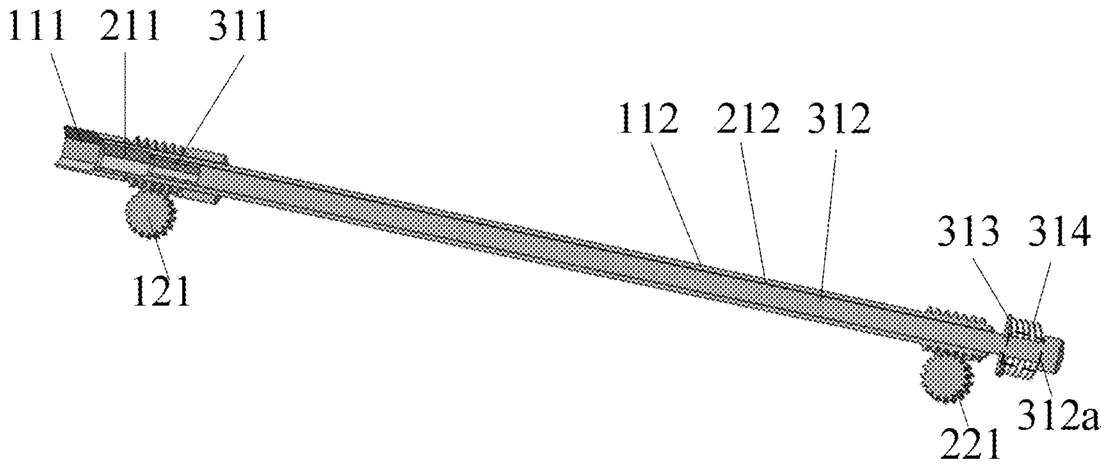
FIG. 14 is a schematic cutaway view of a transfer motion adjustor according to an embodiment of the present disclosure.

FIG. 14 is a schematic cutaway view of a transfer motion adjustor according to an embodiment of the present disclosure. In some embodiments, as shown in FIGS. 11, 12, and 14, the third rotation member 31 includes: a third adjusting element 311 and a third connecting element 312 connected to the third adjusting element 311. The third connecting element 312 is located on a side of the third adjusting element 311 away from the first side surface 2_c_, the third adjusting element 311 is located in the second hollow channel 20, the third adjusting element 311 extends beyond the second hollow channel 20, an end of the second hollow channel 20 close to the first side surface 2_c_ exposes the third adjusting element 311, and an end of the third connecting element 312 away from the first side surface 2_c_ is extendable from the corresponding third hole 43.

In some embodiments, the end of the third rotation member 31 close to the first side surface 2_c_ has a cross-section parallel to the first side surface 2_c_ in a third ring shape with a hexagonal inner contour.

It should be noted that since the portion of the third rotation member 31 close to the first side surface 2_c_ is located in the second hollow channel 20, and the end of the second hollow channel 20 close to the first side surface 2_c_ exposes the third adjusting element 311, the second ring shape has a diameter larger than the third ring shape, and further, the second external jig matched with the inner contour of the second ring shape has greater specifications than the third external jig matched with the inner contour of the third ring shape.

Figure 15:
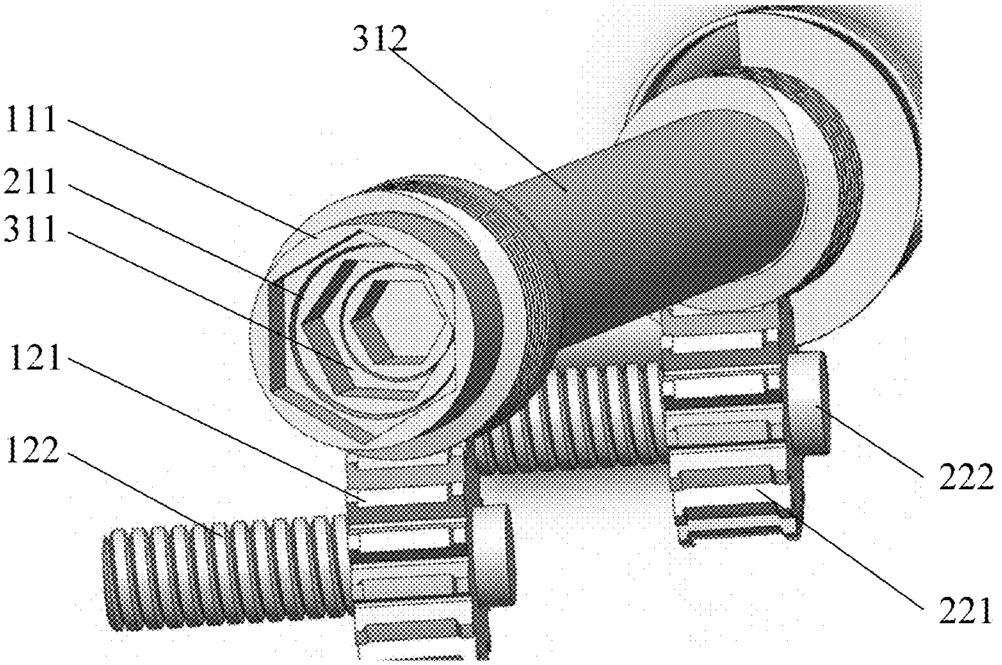
FIG. 15 is a partial schematic view of a transfer motion adjustor according to an embodiment of the present disclosure.

FIG. 15 is a partial schematic view of a transfer motion adjustor according to an embodiment of the present disclosure. In some embodiments, as shown in FIGS. 2 and 15, the end of the first rotation member 11 close to the first side surface 2_c_ has a cross-section parallel to the first side surface 2_c_ in a first ring shape with a hexagonal inner contour, and the end of the third rotation member 31 away from the first side surface 2_c_ has a cross-section parallel to the first side surface 2_c_ in a hexagonal shape, so that the end of the first rotation member 11 close to the first side surface 2_c_ is engaged with the first adjusting element 111 of a further bracket structure in a direction parallel to the first side surface 2_c_.

Figure 16:
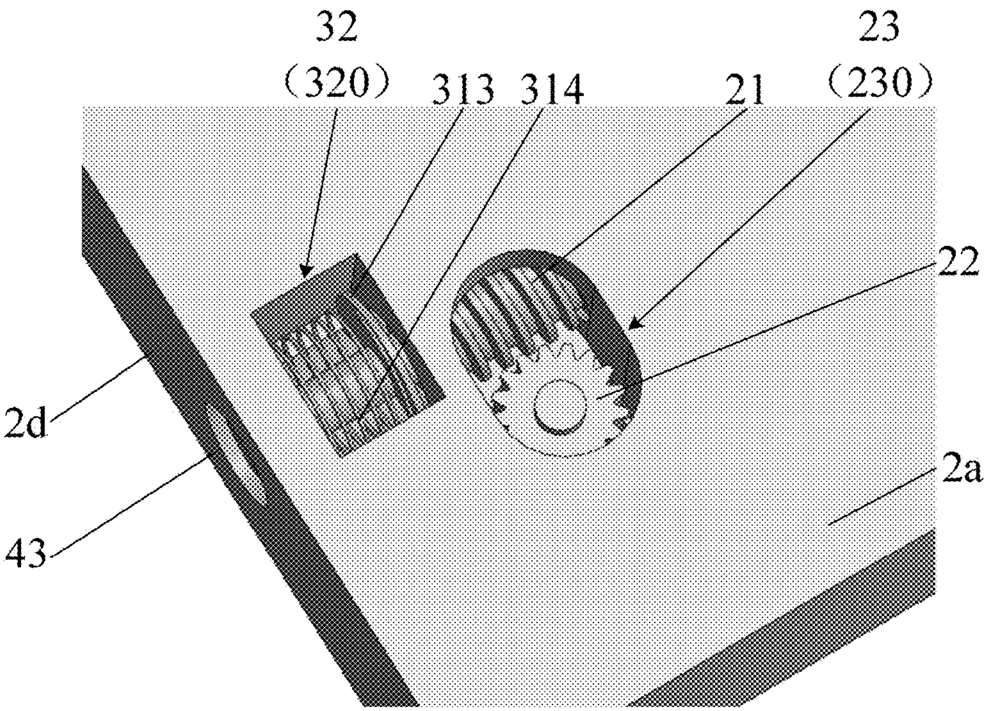
FIG. 16 is a schematic structural view of another bracket structure according to an embodiment of the present disclosure.

FIG. 16 is a schematic structural view of another bracket structure according to an embodiment of the present disclosure. In some embodiments, as shown in FIGS. 14 to 16, the third rotation member 31 further includes: a location-limited element 313 and a third elastic component 314. A third assembly space 32 is formed inside the body 2 at a position close to the third hole 43 and in communication with the third hole 43. The location-limited element 313 is located in the third assembly space 32, and fixed to a portion of the third connecting element 312 outside the second hollow channel 20. The third elastic component 314 is located in the third assembly space 32, having one end connected to the location-limited element 313 and the other end connected to a side wall of the third assembly space 32 close to the third hole 43.

The third assembly space 32 is configured to receive the location-limited element 313 and the third elastic component 314 on the third rotation member 31, and during assembly, the location-limited element 313 and the third elastic component 314 may be fitted into the body 2 of the bracket structure through the third hole 43 in communication with the third assembly space 32.

In some embodiments, a first clamping element (not shown) is provided on the location-limited element 313, a second clamping element (not shown) is provided on the portion of the third connecting element 312 outside the second hollow channel 20, and the first clamping element is engaged and fixed with the second clamping element, so that the location-limited element 313 and the third connecting element 312 are detachably mounted to facilitate assembly.

In some embodiments, as shown in FIGS. 7 and 14, the elastic component includes a third spring nested on an exterior 312_a_ of a portion of the third connecting element 312 in the third assembly space 32. In an example the same as that shown in FIG. 9, as shown in FIG. 13, when the first rotation member 11 of the bracket structure 1-1 is rotated through the third rotation member 31 of the bracket structure 2-1, an end of the third rotation member 31 of the bracket structure 2-1 close to the third side surface 2_d_ of the bracket structure 2-1 is desired to be extended into the first hole 41 of the bracket structure 1-1, and after the adjustment is completed, a force in the first direction X is applied to an end of the third rotation member 31 of the bracket structure 2-1 close to the first side surface 2*c* of the bracket structure 2-1, and based on the cooperation of the elastic component and the location-limited element 313, the end of the third rotation member 31 of the bracket structure 2-1 close to the third side surface 2*d* of the bracket structure 2-1 may be retracted into the body 2 of the bracket structure 2-1, so that the third rotation member 31 of the bracket structure 2-1 is reset. In other words, after the assembly/adjustment is completed, there is no physical connection between any adjacent bracket structures caused by any component on the transfer motion adjustor 1, so as to avoid damage to the tiled display device. The first direction X refers to an extending direction of the first rotation member 11, that is, an extending direction of the third rotation member 31.

The reset of the third rotation member 31 of the bracket structure 2-1 means returning the third rotation member 31 of the bracket structure 2-1 to an initial position, i.e., the state of the third rotation member 31 of the bracket structure 2-1 shown in FIG. 12.

In some embodiments, as shown in FIGS. 2, 11 and 16, the support surface 2*b* is provided with a third assembly hole 320 in communication with the third assembly space 32. Therefore, the location-limited element 313 and the elastic component can be directly assembled into the body 2 of the bracket structure through the third assembly hole 320 during assembly.

Since the portion of the second rotation member 21 close to the first side surface 2*c* is located in the first hollow channel 10, and the portion of the third rotation member 31 close to the first side surface 2*c* is located in the second hollow channel 20, it means that the first connecting element 112 is nested on the second connecting element 212, and the second connecting element 212 is nested on the third connecting element 312.

As shown in FIG. 2, the lower left part of FIG. 2 provides an exploded view of the transfer motion adjustor 1, and the upper right part of FIG. 2 shows a fourth assembly space 1A for placing the transfer motion adjustor 1. Specifically, during assembly of the transfer motion adjustor 1, the three connecting elements are sequentially nested and then placed into the fourth assembly space 1A in the body 2 of the bracket structure through the first hole 41; the first guide member 12 is placed into the first assembly space 13 through the first assembly hole 130; the second guide member 22 is placed into the second assembly space 23 through the second assembly hole 230; and the location-limited element 313 and the elastic component on the third rotation member 31 are placed into the third assembly space 32 through the third assembly hole 320 or the third hole 43 in communication with the third assembly space 32, thereby completing assembly of the entire transmission adjusting assembly 1.

In some embodiments, a fixing component 50 is provided on the body 2 on a side of the assembly surface 2*a*, and configured to be fixed to a case.

Figure 17:
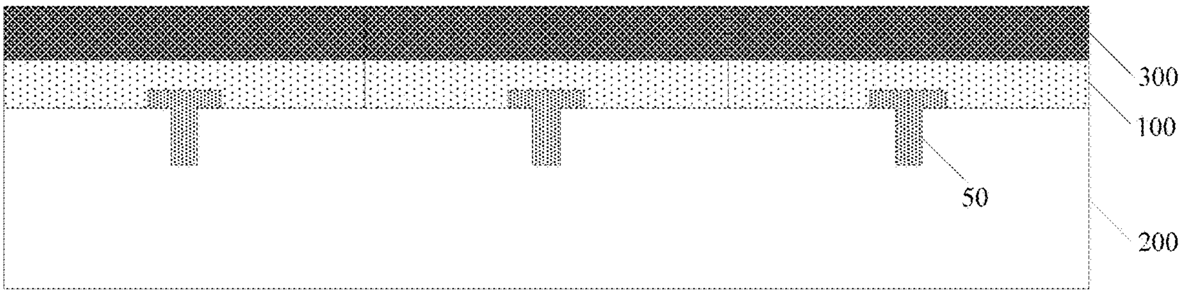
FIG. 17 is a schematic structural view of a tiled display device according to an embodiment of the present disclosure.

FIG. 17 is a schematic structural view of a tiled display device according to an embodiment of the present disclosure. In some embodiments, as shown in FIG. 17, the tiled display device includes a case 200 and a plurality of sub-display panel modules. Each sub-display panel assembly includes a bracket structure 100 and a display panel 300 supported on the bracket structure 100. The bracket structure 100 is fixedly connected to the case 200 through the fixing component 50.

As shown in FIGS. 1 and 4, in some embodiments, the fixing component 50 is provided on the assembly surface 2*a*; and in other embodiments, the fixing component 50 may form an integral structure with the transfer motion adjustor 1. For example, as shown in FIG. 6, the fixing component 50 may be connected to the first guide member 12 and/or the second guide member 22.

In some embodiments, the fixing component 50 may include: a magnetic member or a suction disc. Optionally, when the fixing portion 50 is a magnetic member, a second magnetic member matched with the magnetic member is provided on the case, and the two are attracted and connected to each other; and when the fixing portion 50 is a suction disc, an adsorption surface matched with the suction disc is provided on the case, and the two are connected by means of an adsorption force. It is also possible to connect the case and the bracket structure in an engagement manner through matched engagement members, or fixedly connect the case and the bracket structure by screws, which is not limited in the embodiments of the present disclosure.

In some embodiments, as shown in FIGS. 1 and 2, two transfer motion adjustors 1 are provided inside the body 2, and the two transfer motion adjustors 1 are arranged in a direction intersected with an extending direction of the first rotation member 11.

Figure 18:
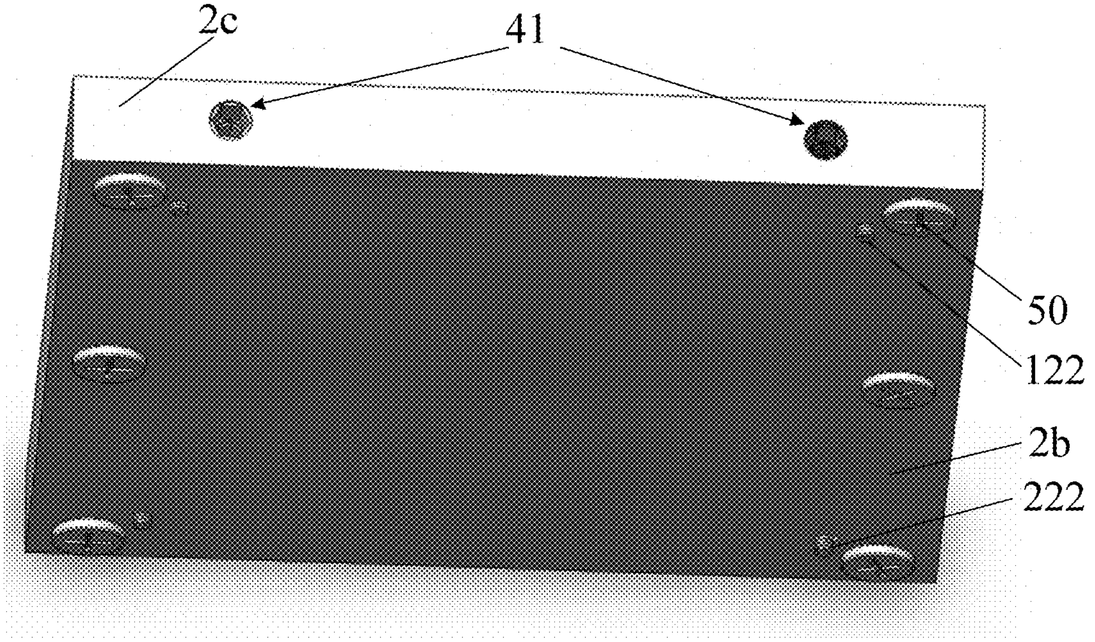
FIG. 18 is a schematic structural view of another bracket structure according to an embodiment of the present disclosure.

FIG. 18 is a schematic structural view of another bracket structure according to an embodiment of the present disclosure. In some embodiments, when the transfer motion adjustor 1 includes a second guide member 22, the first guide members 12 and the second guide members 22 in the two transfer motion adjustors 1, four guide members in total, are distributed at four corners of the bracket structure, respectively. As shown in FIGS. 1, 2 and 18, a guide member is disposed at each of the four corners of the bracket structure, and through the first holes 41 corresponding to the two transfer motion adjustors 1 on the first side surface 2*c*, the protruding amount of any one of the guiding members distributed at the four corners on the assembly surface 2*a*, i.e., a height of any angle of the bracket structure can be adjusted, so as to adjust the flatness of the support surface 2*b* of the bracket structure and ensure flatness of display surfaces of the plurality of display substrates in the tiled display device, thereby improving the display effect.

An embodiment of the present disclosure further provides a sub-display panel module, including the bracket structure as described above, and a display substrate carried on the support surface 2*b* of the bracket structure.

An embodiment of the present disclosure further provides a tiled display device, including a plurality of sub-display panel modules and a case for assembling the sub-display panel modules, where at least one the sub-display panel modules is the sub-display panel assembly as described above.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A bracket structure, wherein the bracket structure comprises a body and at least one transfer motion adjustor, wherein the body has a support surface, an assembly surface, and at least one side surface, the support surface is disposed opposite to the assembly surface, the side surface is disposed between the support surface and the assembly surface, the at least one side surface comprises a first side surface, and the transfer motion adjustor is located inside the body;

the transfer motion adjustor comprises: a first rotation member and a first guide member connected to the first rotation member, wherein the first rotation member is close to the first side surface, and a first hole is provided on the first side surface at a position corresponding to the first rotation member, to expose an end of the first rotation member close to the first side surface, so that a first external jig adjusts the first rotation member to rotate through the end of the first rotation member close to the first side surface and exposed from the first hole; and a second hole is provided on the assembly surface at a position corresponding to the first guide member, and the first guide member is configured to move along the second hole in response to the rotational control of the first rotation member to adjust a protruding amount of the first guide member on the assembly surface, wherein the first rotation member comprises: a first adjusting element and a first connecting element connected to the first adjusting element, and the first guide member comprises a first worm and a first worm wheel nested on the first worm;

the first connecting element is provided with first threads, the first worm wheel is provided with engaging insections matched with the first threads, the first worm wheel is configured to rotate in response to rotation of the first connecting element, and a rotation axis of the first worm wheel is perpendicular to a rotation axis of the first connecting element; and the first worm is provided with second threads, the second hole is provided with internal threads matched with the second threads, and the first worm is configured to rotate coaxially with the first worm wheel to move along the second hole.

2. The bracket structure according to claim 1, wherein the first connecting element is located on a side of the first adjusting element away from the first side surface, and the first hole exposes the first adjusting element.

3. The bracket structure according to claim 1, wherein a first assembly space is formed inside the body at a position close to the second hole and in communication with the second hole, and the first worm and the first worm wheel are both located in the first assembly space;

the first guide member further comprises: a first elastic component in the first assembly space, the first elastic component having one end connected to the first worm wheel and the other end connected to a bottom wall of the first assembly space close to the second hole;

the first elastic component comprises a first spring nested outside the first worm; and the support surface is provided with a first assembly hole in communication with the first assembly space.

4. The bracket structure according to claim 1, wherein the first rotation member extends in a first direction parallel to a plane where the assembly surface is located and intersected with the first side surface, and the first rotation member has a first hollow channel running through the first rotation member in the first direction;

the transfer motion adjustor further comprises a second rotation member and a second guide member connected to the second rotation member, wherein a portion of the second rotation member close to the first side surface is located in the first hollow channel, and an end of the first hollow channel close to the first side surface exposes an end of the second rotation member close to the first side surface, so that a second external jig adjusts the second rotation member to rotate through the end of the second rotation member close to the first side surface and exposed from the first hollow channel; and a fourth hole is provided on the assembly surface at a position corresponding to the second guide member, and the second guide member is configured to move along the fourth hole in response to the rotational control of the second rotation member to adjust a protruding amount of the second guide member on the assembly surface.

5. The bracket structure according to claim 4, wherein the second rotation member comprises: a second adjusting element and a second connecting element connected to the second adjusting element, the second connecting element is located on a side of the second adjusting element away from the first side surface, the second adjusting element is located in the first hollow channel, the second connecting element extends beyond the first hollow channel, and an end of the first hollow channel close to the first side surface exposes the second adjusting element.

6. The bracket structure according to claim 5, wherein the second guide member comprises a second worm and a second worm wheel nested on the second worm;

the second connecting element is provided with third threads, the second worm wheel is provided with engaging insections matched with the third threads, the second worm wheel is configured to rotate in response to rotation of the second connecting element, and a rotation axis of the second worm wheel is perpendicular to a rotation axis of the second connecting element; and the second worm is provided with fourth threads, the fourth hole is provided with internal threads matched with the fourth threads, and the second worm is configured to rotate coaxially with the second worm wheel to move along the fourth hole.

7. The bracket structure according to claim 6, wherein a second assembly space is formed inside the body at a position close to the fourth hole and in communication with the fourth hole, and the second worm and the second worm wheel are both located in the second assembly space;

the second guide member further comprises: a second elastic component in the second assembly space, the second elastic component having one end connected to the second worm wheel and the other end connected to a bottom wall of the second assembly space close to the fourth hole;

the second elastic component comprises a second spring nested outside the second worm; and the support surface is provided with a second assembly hole in communication with the second assembly space.

8. The bracket structure according to claim 4, wherein the end of the second rotation member close to the first side surface has a cross-section parallel to the first side surface in a second ring shape with a hexagonal inner contour.

9. The bracket structure according to claim 4, wherein the second rotation member extends in the first direction and has a second hollow channel running through the second rotation member in the first direction;

the transfer motion adjustor further comprises a third rotation member, and the at least one side surface further comprises: a third side surface opposite to the first side surface in the first direction, wherein a third hole is provided on the third side surface at a position corresponding to the third rotation member to expose an end of the third rotation member close to the third side surface, and configured to allow an end of the third rotation member away from the first side surface to extend out of the third hole;

a portion of the third rotation member close to the first side surface is located in the second hollow channel, and an end of the second hollow channel close to the first side surface exposes an end of the third rotation member close to the first side surface, so that a third external jig pushes the third rotation member to extend out of the third hole and adjusts the third rotation member to rotate through the end of the third rotation member close to the first side surface and exposed from the second hollow channel; and the end of the third rotation member away from the first side surface is configured to be extendable into the first hole of a further bracket structure, and engaged with the end of the first rotation member close to the first side surface and exposed from the first hole in the further bracket structure in a direction parallel to the first side surface.

10. The bracket structure according to claim 9, wherein the third rotation member comprises: a third adjusting element and a third connecting element connected to the third adjusting element, the third connecting element is located on a side of the third adjusting element away from the first side surface, the third connecting element is located in the second hollow channel, the third adjusting element extends beyond the second hollow channel, an end of the second hollow channel close to the first side surface exposes the third adjusting element, and an end of the third connecting element away from the first side surface is extendable from the third hole.

11. The bracket structure according to claim 10, wherein the third rotation member further comprises: a location-limited element and a third elastic component, a third assembly space is formed inside the body at a position close to the third hole and in communication with the third hole;

the location-limited element is located in the third assembly space, and fixed to a portion of the third connecting element outside the second hollow channel;

the third elastic component is located in the third assembly space, having one end connected to the location-limited element and the other end connected to a side wall of the third assembly space close to the third hole;

a first clamping element is provided on the location-limited element, a second clamping element is provided on the portion of the third connecting element outside the second hollow channel, and the first clamping element is engaged and fixed with the second clamping element;

the elastic component comprises a third spring nested on an exterior of a portion of the third connecting element in the third assembly space; and the support surface is provided with a third assembly hole in communication with the third assembly space.

12. The bracket structure according to claim 9, wherein the end of the third rotation member close to the first side surface has a cross-section parallel to the first side surface in a third ring shape with a hexagonal inner contour.

13. The bracket structure according to claim 9, wherein the end of the first rotation member close to the first side surface has a cross-section parallel to the first side surface in a first ring shape with a hexagonal inner contour; and the end of the third rotation member away from the first side surface has a cross- section parallel to the first side surface in a hexagonal shape.

14. The bracket structure according to claim 1, wherein a fixing component is provided on the body on a side of the assembly surface, and configured to be fixed to a case.

15. The bracket structure according to claim 14, wherein the fixing component is connected to the assembly surface;

and/or the fixing component is connected to the first guide member;

and/or when the bracket structure comprises a second guide member, the fixing component is connected to the second guide member.

16. The bracket structure according to claim 1, wherein two transfer motion adjustors are provided inside the body, and the two transfer motion adjustors are arranged in a direction intersected with an extending direction of the first rotation member.

17. The bracket structure according to claim 16, wherein when the transfer motion adjustor comprises a second guide member, the first and second guide members in the two transfer motion adjustors, four guide members in total, are distributed at four corners of the bracket structure, respectively.

18. A sub-display panel module, comprising the bracket structure of claim 1, and a display substrate carried on the support surface of the bracket structure.

19. A tiled display device, comprising a plurality of sub-display panel modules and a case for assembling the sub-display panel modules, wherein at least one of the sub-display panel modules is the sub-display panel module of claim 18.

* * * * *